US009447849B1

(12) United States Patent
Edsinger et al.

(10) Patent No.: US 9,447,849 B1
(45) Date of Patent: Sep. 20, 2016

(54) ROBOT MANIPULATOR WITH MODULAR TORQUE CONTROLLED LINKS

(71) Applicant: Redwood Robotics, Inc., San Francisco, CA (US)

(72) Inventors: Aaron Edsinger, San Francisco, CA (US); Lee Magnusson, San Francisco, CA (US); Philip Mullins, San Francisco, CA (US); Jeff Vora Weber, San Francisco, CA (US)

(73) Assignee: REDWOOD ROBOTICS, INC., San Francisco, CA (US)

( * ) Notice: Subject to any disclaimer, the term of this patent is extended or adjusted under 35 U.S.C. 154(b) by 230 days.

(21) Appl. No.: 14/197,536

(22) Filed: Mar. 5, 2014

Related U.S. Application Data

(60) Provisional application No. 61/813,786, filed on Apr. 19, 2013.

(51) Int. Cl.
| | | |
|---|---|---|
| *B25J 17/00* | (2006.01) | |
| *B25J 17/02* | (2006.01) | |
| *B25J 18/00* | (2006.01) | |
| *F16H 7/02* | (2006.01) | |
| *B25J 9/10* | (2006.01) | |

(52) U.S. Cl.
CPC ............... *F16H 7/02* (2013.01); *B25J 9/1045* (2013.01)

(58) Field of Classification Search
CPC ...... B25J 9/1045; B25J 9/104; B25J 13/085; B25J 17/025; B25J 19/068; B25J 9/0006; B25J 9/042; B25J 17/0241; B25J 9/1633; F16H 2007/0887; F16H 2007/0846; F16H 7/02; F16H 2007/0842; F16H 7/023; F16H 7/00

USPC .................. 474/85, 88, 133, 84, 150; 74/63, 74/490.04; 73/862.391, 862.194, 862.453, 73/862.195, 862.42, 862.338, 862.472; 901/21; 318/432, 433, 434

See application file for complete search history.

(56) References Cited

U.S. PATENT DOCUMENTS

| | | | | |
|---|---|---|---|---|
| 4,485,594 A * | 12/1984 | Guertin | ................... | B23Q 5/385 451/127 |
| 4,865,376 A * | 9/1989 | Leaver | ................... | B25J 9/1045 294/111 |
| 4,909,086 A * | 3/1990 | Kaneko | ................... | G01L 5/106 73/862.194 |
| 6,324,934 B1* | 12/2001 | Monaghan | ............... | B25J 9/042 74/490.04 |
| 7,615,956 B2* | 11/2009 | Tsusaka | ................. | A63H 11/18 318/568.11 |
| 2001/0040439 A1* | 11/2001 | Kato | ....................... | G05B 19/19 318/432 |
| 2007/0020081 A1* | 1/2007 | Gilchrist | ................ | B25J 9/0087 414/744.5 |

* cited by examiner

*Primary Examiner* — William Kelleher
*Assistant Examiner* — Jake Cook
(74) *Attorney, Agent, or Firm* — McDonnell Boehnen Hulbert & Berghoff LLP

(57) ABSTRACT

An example torque controlled actuator includes a frame, and one or more timing belt stages coupled in serial on the frame. The timing belt stages include an input stage for coupling to a motor and an output stage for coupling to a load, and the timing belt stages couple rotation of the motor to rotation of an output of the output stage. The torque controlled actuator also includes one or more belt idlers coupled to the frame that contact a timing belt of the output stage, and a strain gauge coupled to the frame to determine a tension of the timing belt of the output stage based on force applied by the timing belt of the output stage to the one or more belt idlers.

17 Claims, 14 Drawing Sheets

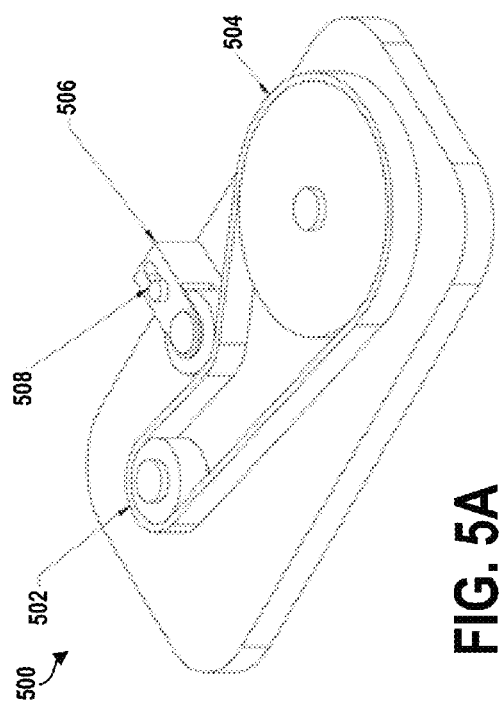
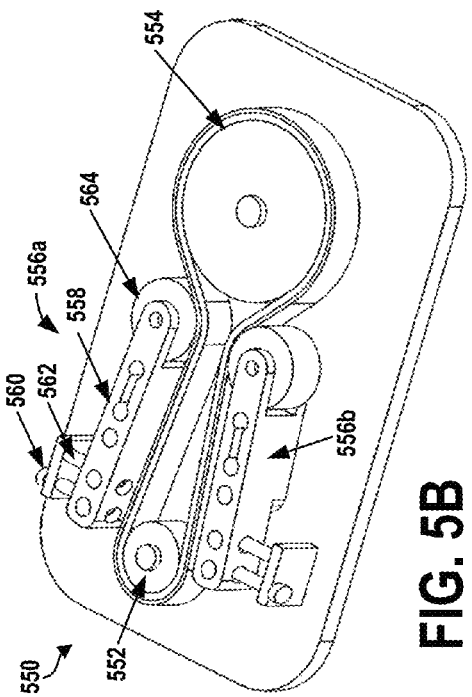
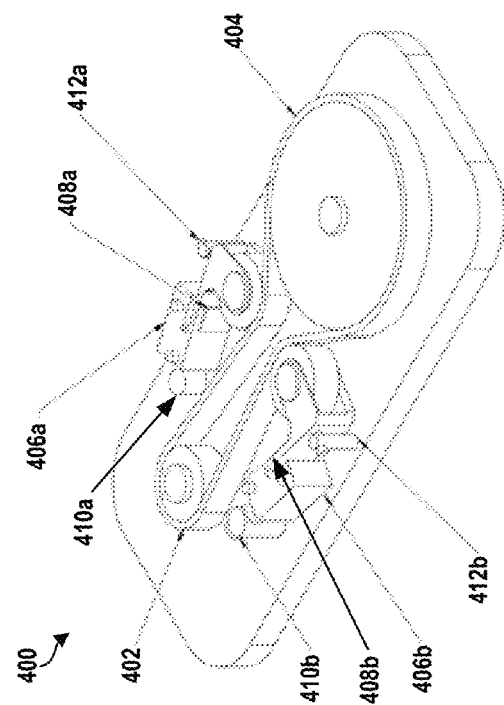

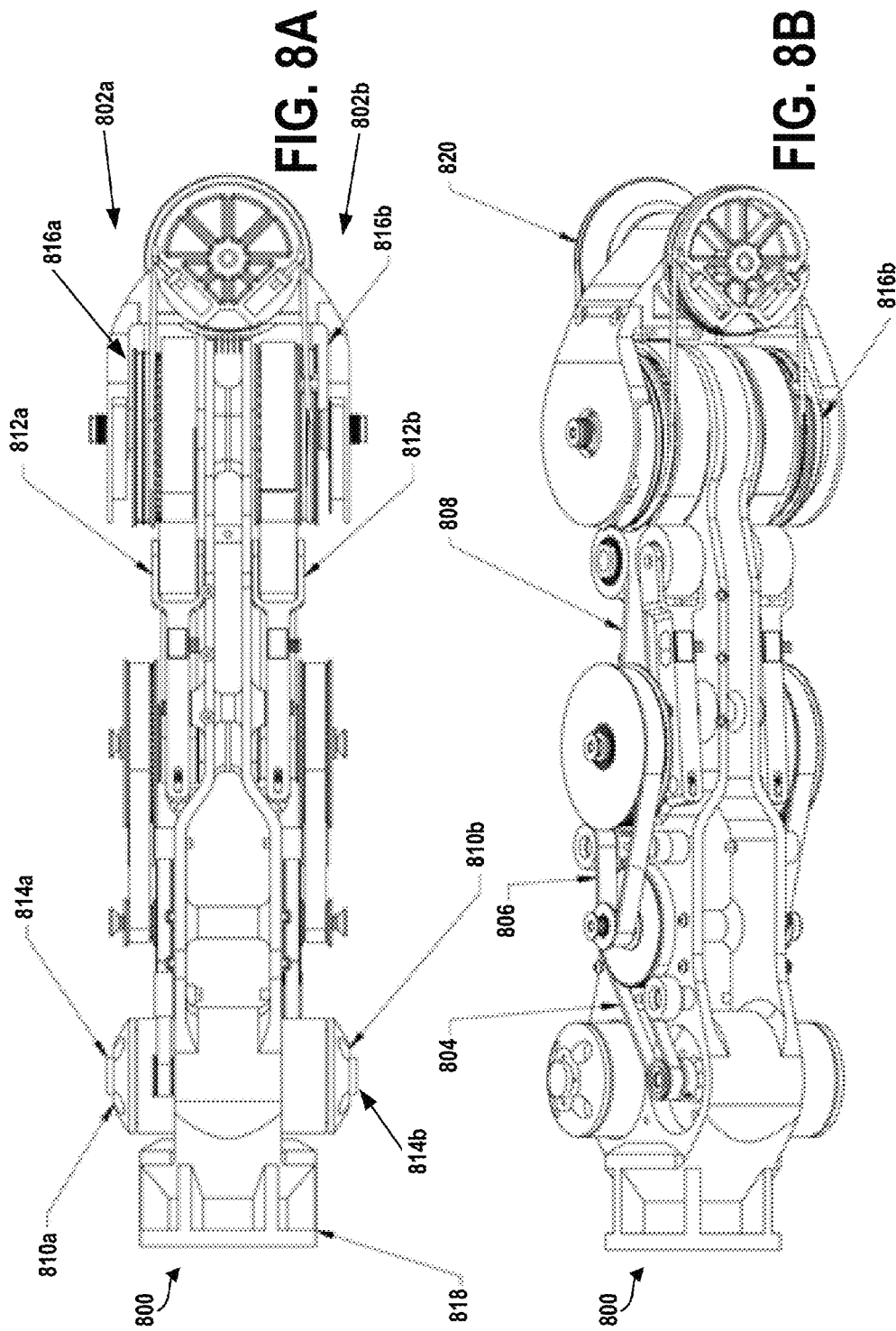

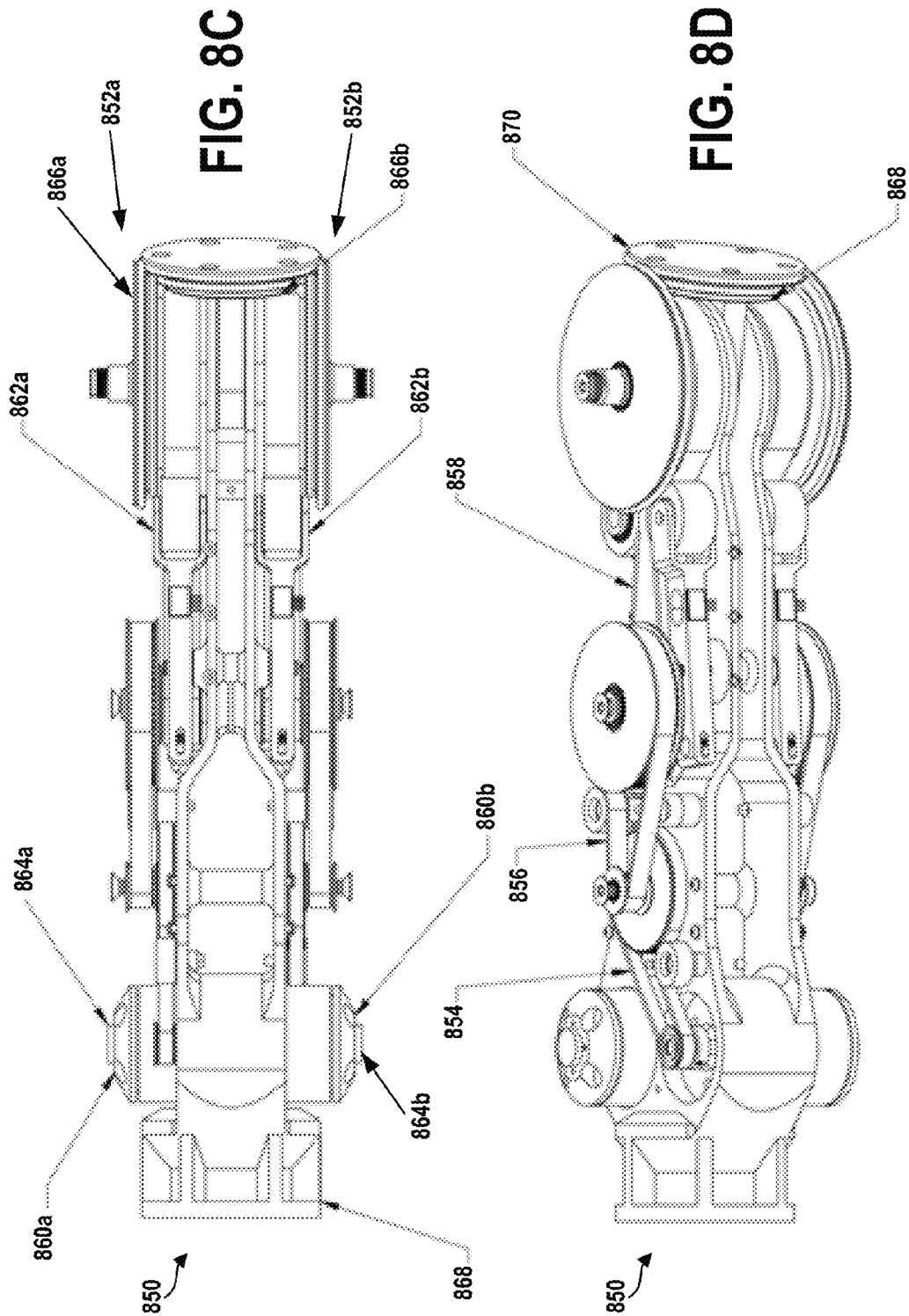

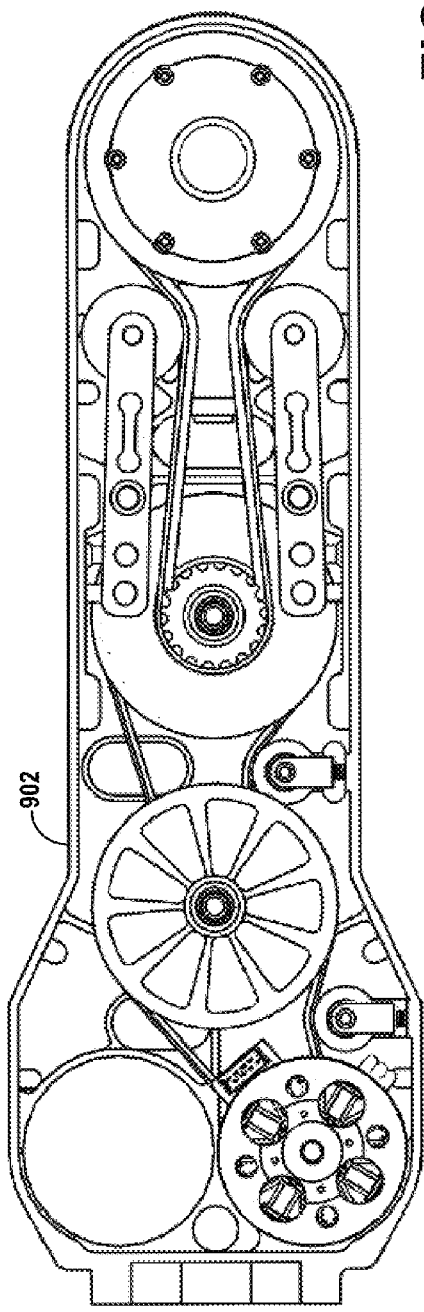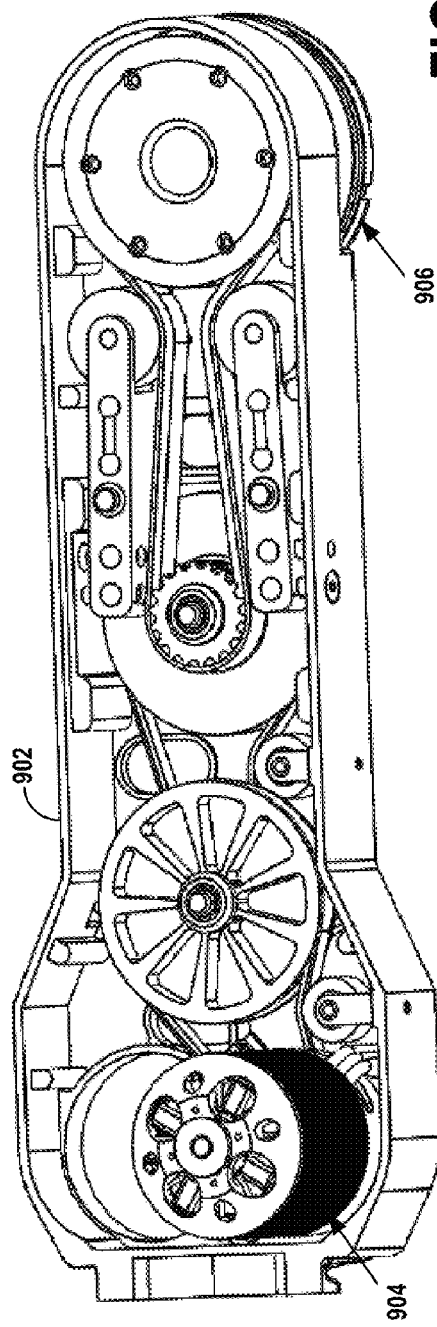

ROBOT MANIPULATOR WITH MODULAR TORQUE CONTROLLED LINKS

CROSS-REFERENCE TO RELATED APPLICATION

The present application also claims priority to U.S. Patent Application Ser. No. 61/813,786, filed on Apr. 19, 2013, the entire contents of which are herein incorporated by reference.

BACKGROUND

Unless otherwise indicated herein, the materials described in this section are not prior art to the claims in this application and are not admitted to be prior art by inclusion in this section.

Electric motor actuators for robotic and automation systems often require a transmission (speed reducer) in order to operate within the speed-torque requirements of a specific application and of the motor. Commonly used systems include multi-stage gearboxes, timing belts, cables with capstans, harmonic drives, and cycloid gearboxes. These systems may have shortcomings, such as too inefficient, susceptible to overload damage, heavy, and require expensive precision manufacturing. Such systems are also often too expensive for consumer products when high performance is required.

As an example, harmonic drive systems can be used in high performance applications where low backlash and gear-ratios greater than 50:1 are required. The harmonic drive is proprietary, heavy, inefficient, susceptible to damage from shock load, and expensive for consumer application. As another example, cable drive systems can be lightweight and efficient; however, achieving useful transmission ratios may lead to complex multi-stage designs that require high preload forces, large cable bend radii, and challenging cable management. Often it is desired to integrate a torque sensor such as a strain gauge load cell at or near the output of the transmission in order to achieve closed loop torque control. Practically, such as a case on a rotating output hub, integration of this sensor can prove challenging as the sensor wires typically rotate with the transmission output, and therefore, require cable management, adding complexity and increasing the number of failure points.

SUMMARY

In one example, a torque controlled actuator is provided that comprises a frame and one or more timing belt stages coupled in serial on the frame. The one or more timing belt stages include an input stage for coupling to a motor and an output stage for coupling to a load, and the one or more timing belt stages couple rotation of the motor to rotation of an output of the output stage. The torque controlled actuator also comprises one or more belt idlers coupled to the frame, and the one or more belt idlers contact a timing belt of the output stage. The torque controlled actuator also comprises a strain gauge coupled to the frame to determine a tension of the timing belt of the output stage based on force applied by the timing belt of the output stage to the one or more belt idlers.

In another example, an actuator system is provided that comprises multiple torque controlled actuators arranged side-by-side, and a given torque controlled actuator comprises one or more timing belt stages coupled in serial including an input stage for coupling to a motor and an output stage for coupling to a load. The one or more timing belt stages couple rotation of the motor to rotation of an output of the output stage. The actuator system also comprises an interface to couple the multiple torque controlled actuators in the side-by-side arrangement, and a differential coupled to outputs of the multiple torque controlled actuators to create a multiple degree of freedom (DOF) actuated joint.

In another example, an actuator system is provided that comprises multiple modular links arranged in serial, and a respective modular link comprises multiple torque controlled actuators arranged side-by-side and a given torque controlled actuator comprises one or more timing belt stages coupled in serial including an input stage for coupling to a motor and an output stage for coupling to a load. The one or more timing belt stages couple rotation of the motor to rotation of an output of the output stage. The modular link also comprises an interface to couple the multiple torque controlled actuators in the side-by-side arrangement, and a differential coupled to outputs of the multiple torque controlled actuators to create a two degree of freedom (DOF) actuated joint. The actuator system also comprises one or more link interfaces to couple the multiple modular links in serial and to provide a multiple DOF robot manipulator.

In still other examples, methods and computer program products including instructions executable by a device or by one or more processors to perform functions of the methods are provided. The methods may be executable for operating a torque controlled actuator, an actuator system, and a robot manipulator.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 4 illustrates an example output belt tension sensing system with a dual idler load cell.

FIG. 5A illustrates an example belt tensioner system.

FIG. 5B illustrates another example belt tensioner system.

FIGS. 8A-8B illustrate side and top views of an example actuator system.

FIGS. 8C-8D illustrate side and top views of another example actuator system.

FIGS. 9A-9B illustrate side and internal views of another example actuator system.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples described herein include subsystems that enable a robot manipulator, including a torque controlled actuator, a modular robot link comprising two such actuators to form a two degree of freedom (DOF) modular link, and an example design for a robot manipulator comprising multiple (seven) such actuators and multiple (three) such links to form a seven DOF arm. The torque controlled actuator may include an electric motor attached to a transmission, and the transmission may include an N-stage belt transmission arranged in a serial fashion that connects rotation of the motor to rotation of an output. Each stage of the transmission may include a belt tensioning mechanism. One or more stages may utilize gears (spur or otherwise) if zero backlash is not required. The torque controlled actuator may also include a sensor that measures motor position, and optionally, a second sensor that measures joint position. The torque controlled actuator may also include one or more belt idler wheels instrumented to measure the belt tension, a motor amplifier with interfaces for actuator sensors (e.g., motor position, joint position, belt tension, and current applied to the motor), and a servo control loop that controls the current or voltage applied to the motor as a function of the sensor values (output torque, motor position, and joint position) to achieve a desired joint position, torque, velocity, and/or joint impedance.

Figure 1:
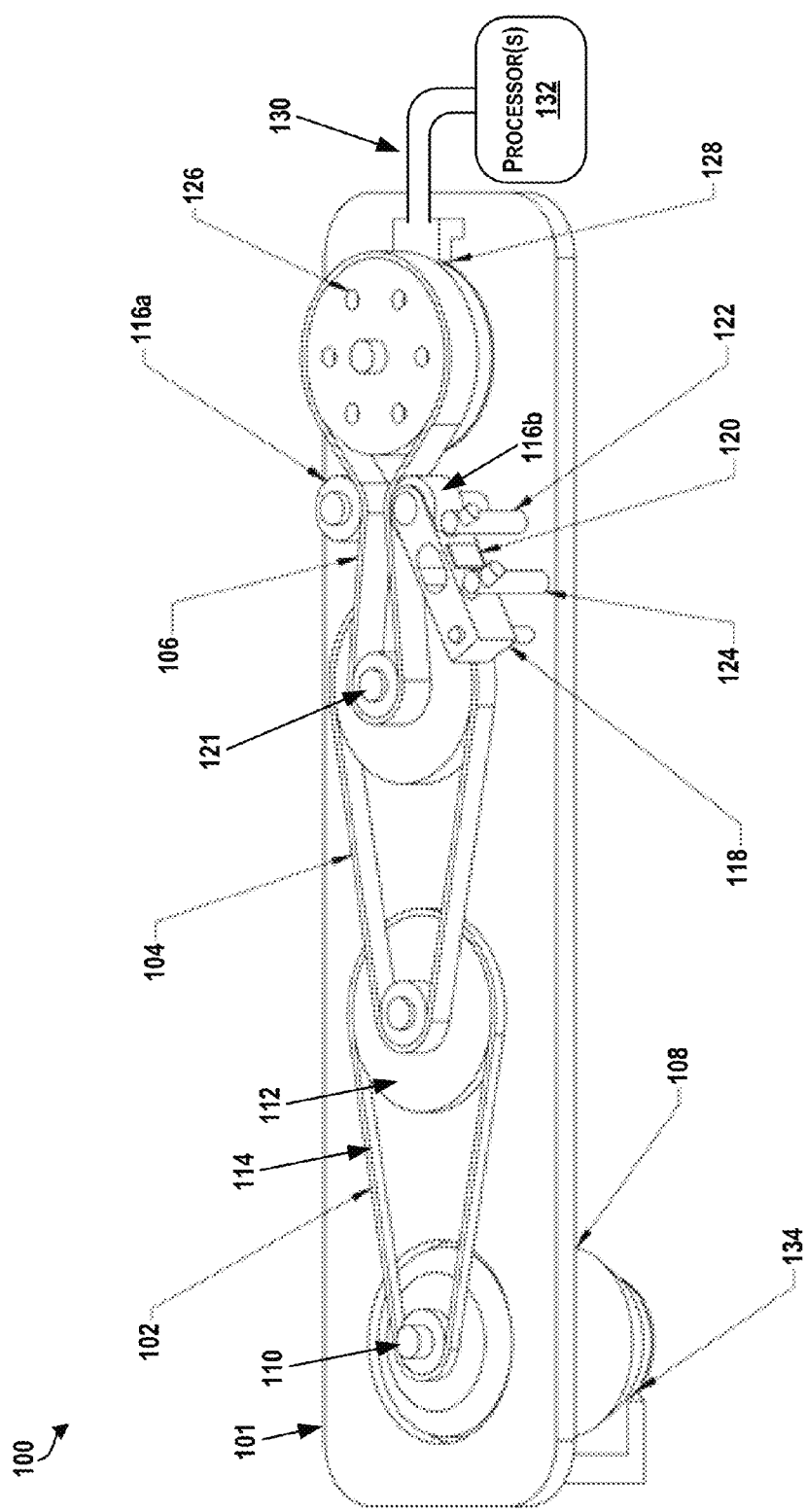
FIG. 1 illustrates an example torque controlled actuator.

Referring now to the figures, FIG. 1 illustrates an example torque controlled actuator 100. The torque controlled actuator 100 comprises a frame 101, and one or more timing belt stages coupled in serial on the frame 101 for speed reduction. The torque controlled actuator 100 in FIG. 1 illustrates a first timing belt stage 102, coupled to a second timing belt stage 104, coupled to a third timing belt stage 106. The timing belt stages include an input stage (e.g., the first timing belt stage 102) for coupling to a motor 108, such as an electric motor, and an output stage (e.g., the third timing belt stage 106) for coupling to a load. The timing belt stages couple rotation of the motor 108 to rotation of an output of the third timing belt stage 106.

Within the torque controlled actuator, each of the timing belt stages 102, 104, and 106 include a stage input 110, a hub 112, and a timing belt 114 wrapped around the stage input and the hub. The stage input 110 and the hub 112 may comprise pulleys mounted on rolling bearings, for example.

As shown in FIG. 1, the motor 108 is positioned on one side of the frame 101, and the timing belt stages 102, 104, and 106 are positioned on the other side of the frame 101. The motor 108 couples to the stage input 110 of the first timing belt stage 102 to cause rotation of the stage input 110, the timing belt 114, and the hub 112.

The torque controlled actuator 100 includes one or more belt idlers, such as belt idlers 116a-b, coupled to the frame, and the belt idlers 116a-b contact a timing belt of the third timing belt stage 106. The belt idlers 116a-b include an idler wheel that rolls against the timing belt of the third timing belt stage 106. Although in this example, a one sided belt is used, other configurations may include use of a belt with a tooth profile on both sides. Further, the belt idlers 116a-b are shown contacting a back side of a one sided belt, and other example configurations may include idlers which contact the belt on a toothed side. In addition, although shown on the third timing belt stage 106, or an output stage, the belt idlers 116a-b may be provided on multiple stages or all stages of the torque controlled actuator 100 within some examples. The belt idlers 116a-b that contact the timing belt stage may be used to apply adjustable tension to the timing belts, and may include a mechanism, such as a dial or wheel, to apply adjustable tension to the timing belts. The belt idlers 116a-b allow for adjustment of overall transmission preload, and therefore, stiffness of the timing belts.

The torque controlled actuator also includes a load cell 118 coupled to the belt idler 116b, and the load cell 118 is arranged as a bending beam. Although one load cell 118 is shown, the torque controlled actuator 100 may include more load cells (as described in later figures). A strain gauge 120 is provided on the load cell 118 to determine a tension of the timing belt of the third timing belt stage 106 based on force applied by the timing belt of the third timing belt stage 106 to the belt idler 116b. Deflection of the load cell 118 is determined by the strain gauge 120, for example. Although one strain gauge is illustrated, the load cell 118 may include multiple strain gauges, such as one on each surface of the load cell 118 and oriented in different manners. The strain gauge 120 may be a capacitive load cell, a hall effect load cell, or other device to measure load applied, for example.

The torque controlled actuator 100 also includes a hardstop 122 coupled to the frame 101 for limiting an amount of deflection of the load cell 118. For example, the hardstop 122 may be a mechanical hardstop employed to limit overall deflection of the load cell 118 during an overload condition to provide overload protection. The hardstop 122 restricts a range of motion and protects the load cell 118 from elastic deformation. As shown, the hardstop 122 may include a post with a setscrew for hardstop adjustment. A load cell tensioner 124 may also be included to apply adjustable tension to the timing belt.

The third timing belt stage 106 includes a stage input 121 and drives an output hub 126 to which an actuator load is attached. Output torque is measured by sensing tension in the timing belt of the third timing belt stage 106. As described, the belt tension is measured by the load cell 118 that instruments the one or more belt idlers 116a-b. An angular position of the output hub 126 can be measured using an encoder 128 or similar sensor that is coupled to the frame 101.

The third timing belt stage 106 is shown to include the belt idlers 116a-b and load cell 118. In other examples, each stage of the torque controlled actuator 100 includes belt idlers and load cells to determine a torque at each stage.

The torque controlled actuator 100 also includes or couples to a control bus 130 and one or more processors 132, and the strain gauge 120 outputs the tension of the timing belt of the third timing belt stage 106 to the control bus 130. The processor(s) 132 are coupled to the control bus 130 for determining output torque of the torque controlled actuator based on the tension of the timing belt of the third timing belt stage 106 stage.

The torque controlled actuator 100 also include a motor encoder 134 (or other angular displacement sensor) coupled to or attached to the motor 108 to determine or sense an angular position of the motor 108. A motor amplifier (not shown in FIG. 1) may also be included that determines a motor current based on the tension of the timing belt of the third timing belt stage 106. In one example, the motor amplifier determines the motor current based on a servo control loop to control the motor current applied to the motor 108 to achieve a desired output torque (described more fully below).

Within the example torque controlled actuator 100, three timing belt stages are illustrated, however, the design may be implemented as an N-stage system including 1-N timing belt stages. Each timing belt stage provides a reduction of motor input speed while it increases torque output. An example single timing belt stage may provide a reduction or about 2:1 to about 6:1, or other reductions are possible as well including a 1:1 power transfer stage that can also be used to sense force for instance. Thus, three timing belt stages coupled serially may provide a reduction of motor input of about 35:1 to about 40:1. This enables a low gear ratio that may offer increased performance with the timing belts. Using a low gear ratio lowers the inertia of the actuator or modular link enabling safe operation of the torque controlled actuator 100 next to a human operator, for example. This may also provide better passive control characteristics and better fourth control bandwidth, for example.

The example torque controlled actuator 100 thus includes a motor driven belt system to an output joint that uses one or more idlers to measure belt tension, from which torque of the joint can be deduced (i.e., to convert units of strain from output of strain gauge to units of torque). The belt idlers 116a-b put tension on the timing belt and the strain gauge 120 can measure belt tension for determination of output torque. The load cell 118 is fixed to the frame 101 and is not moving with the output, and thus, no load cell cables are required for rotation of the output hub.

Timing belts of the torque controlled actuator 100 exhibit zero backlash, which enables precise applications. The timing belts also exhibit transmission compliance, which makes the joint non-stiff and therefore safer for human contact. Sensing of both the motor position, using the motor encoder 134, and the joint position, using the output encoder 128, allows for precise control of an output angle even though the torque controlled actuator 100 exhibits elasticity. Similarly, sensing of belt tension of the output stage enables direct measurement and control of the joint torque, and cancellation of transmission friction by closing a servo control loop around a force sensor (e.g., strain gauge 120).

In other examples, output torques can be determined without strain gauges. For example, output torque can be estimated based on current applied to achieve a torque. Currents can be applied to determine known output torques over time, and a magnitude of the current can be associated with an output torque.

Within examples, overall efficiency of the torque controlled actuator 100 may be approximately $0.95^N$, where N is a number of timing belt stages. For an example three stage system, this may result in about an 85% efficient transmission that enables a lower torque motor compared to those used in a harmonic drive transmission.

The torque controlled actuator 100 in FIG. 1 is illustrated with the belt idlers 116a-b. Other forms of belt tensioning are possible as well.

Figure 2:
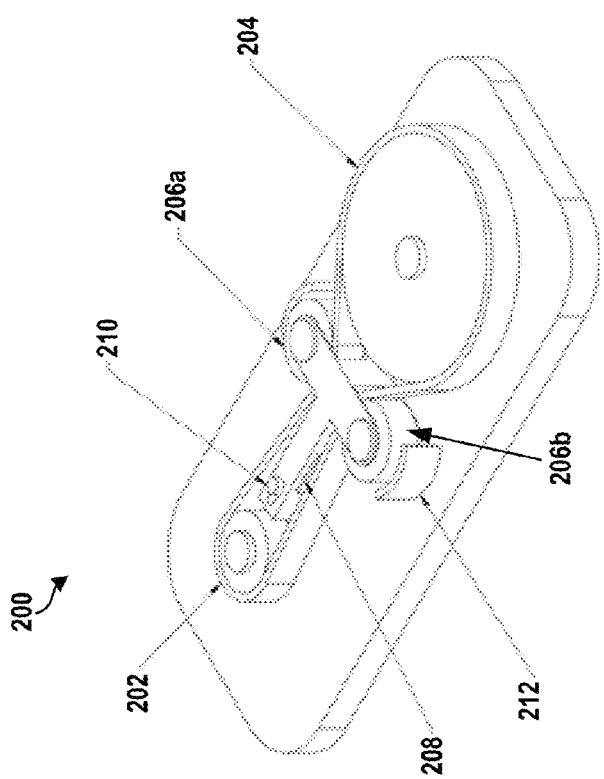
FIG. 2 illustrates an example output belt tension sensing system with a single T load cell.

FIG. 2 illustrates an example output belt tension sensing system 200 with a single T load cell. A single stage timing belt is shown in FIG. 2, which has an input 202 that comes from a motor or a previous stage (as shown in FIG. 1), and an output 204 that may couple to a subsequent stage or a load. Two idlers 206a-b maintain a belt preload tension and transmit output load to a sensor 208, which may be a strain gauge. The idlers 206a-b are provided in a T-shaped configuration so as to contact the timing belt at locations along a length of the timing belt and opposite each other. A single 'T' shaped load cell in a bending beam configuration is used that comprises a slider 210, the sensor 208, and the idlers 206a-b. The belt is pre-tensioned with a slider 210 that moves the 'T' towards the output 204. A positively applied output torque deflects the beam upward and a negative torque deflects the beam downward. A hardstop 212 is also included, similar to the hardstops shown in FIG. 1, for example.

Figure 3:
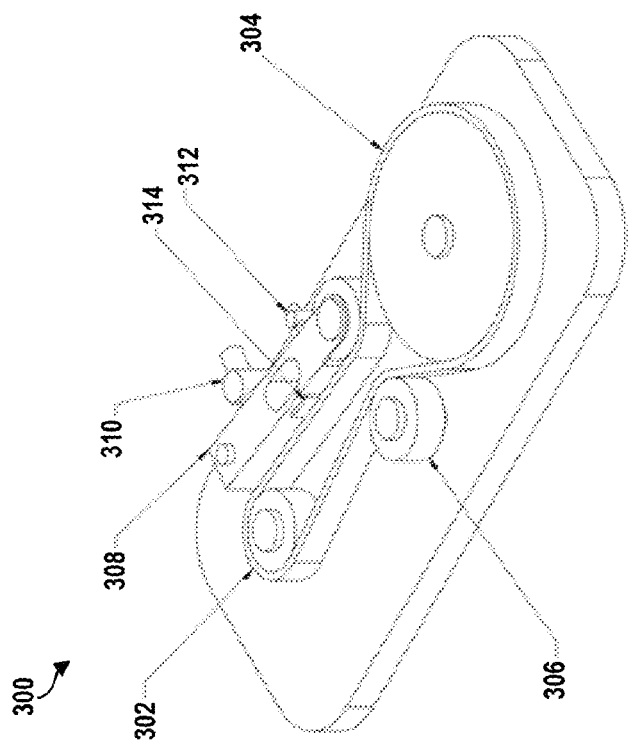
FIG. 3 illustrates an example output belt tension sensing system with a single idler load cell.

FIG. 3 illustrates an example output belt tension sensing system 300 with a single idler load cell. The system 300 in FIG. 3 is similar to the system shown in FIG. 1. As shown in FIG. 3, an input 302 is provided that comes from a motor or a previous stage (as shown in FIG. 1), and an output 304 is provided that may couple to a subsequent stage or a load. A fixed idler 306 is optionally employed on one side of the belt, and the other side of the belt has a load cell assembly 308 including a tensioning mechanism 310 and hardstop 312. A setting of the belt pretension may ensure that the belt does not lose tension (or go slack) under normal working loads. Therefore, a belt tension measurement, $F_b$, is accurate for both positive and negative applied torque loads. The load cell assembly 308 includes a strain gauge 314 to sense the belt tension measurement.

FIG. 4 illustrates an example output belt tension sensing system 400 with a dual idler load cell. As shown in FIG. 4, an input 402 is provided that comes from a motor or a previous stage (as shown in FIG. 1), and an output 404 is provided that may couple to a subsequent stage or a load. As shown in FIG. 4, two load cell assemblies 406a-b are utilized, one on each side of the belt. This provides redundant sensing and also permits one side of the belt to go slack, if desired. The load cell assemblies 406a-b include respective strain gauges 408a-b, tensioners 410a-b, and hardstops 412a-b. In this configuration, a combined load can be computed by subtracting measurements from the two strain gauges 408a-b, $F_{ida}$ and $F_{idb}$:

$$F_{id}'=(F_{ida}-F_{idb})/2$$

In the system 400 in FIG. 4, strain gauges are provided on both sides of the belt for redundancy in sensing. If there is a failure of one sensor, a variation in calculation from one sensor, etc., outputs from both sensors are provided and a common mode variation can be rejected. Such common mode variations may include variations due to temperature, manufacturing differences of belts, etc. With multiple sensor measurements, the variations can be canceled or subtracted to achieve an accurate force sensing signal with mechanical variations in the belts, for example. Thus, in FIG. 4, multiple belt idlers are provided at multiple locations along a length of the timing belt, and the strain gauge 408a is configured to determine a first tension of the timing belt of the output stage based on force applied by the timing belt of the output stage to the tensioner 410a, and the strain gauge 408b determines a second tension of the timing belt of the output stage based on force applied by the timing belt of the output stage to the tensioner 410b. The tension of the timing belt of the output stage is based on a difference of the first tension and the second tension, as shown above.

FIG. 5A illustrates an example belt tensioner system 500. The belt tensioner system 500 includes an input 502 is provided that comes from a motor or a previous stage (as shown in FIG. 1), and an output 504 is provided that may couple to a subsequent stage or a load. The system 500 includes a tensioner assembly 506 that includes a tensioner 508, which may be adjustable. Each belt can be preloaded above a working load of the transmission such that one side of the belt never goes slack. FIG. 5A illustrates one timing belt stage, and each timing belt stage may include the tensioner assembly 506 including the adjustable tensioner 508. The tensioner assembly 506 can be constructed from a post with a set screw that pushes against the tensioner 508 lever arm. The tensioner 508 is mounted on a pin such that the tensioner 508 can pivot an idler wheel toward the belt when the setscrew is turned. The tensioner assembly 506 can take many other forms as well, such as eccentric hubs, for example.

FIG. 5B illustrates another example belt tensioner system 550. The belt tensioner system 550 includes an input 552 that comes from a motor or previous stage and an output 554 that may couple to a subsequent stage or a load. The belt tensioner system 550 includes two tensioner assemblies 556a-b. Each tensioner assembly 556-ab may be the same. The tensioner assembly 556a may include an idler arm 558 on a pivot, for example. A screw 560 threads into the idler arm 558 and pulls against the idler arm 558 causing the idler arm 558 to tension against the belt. Once the tension is set, a second screw 562 is used to push against the idler arm 558 causing the idler arm 558 to lock into place. The idler arm 558 causes an idler wheel 564 to contact the belt for tension in the belt.

Figure 6B:
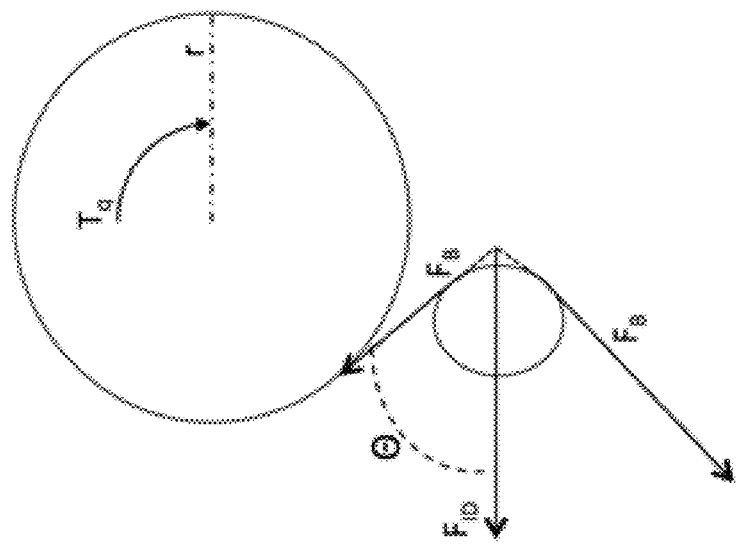
FIG. 6B is a diagram showing an example calculation of the output torque.
Figure 6A:
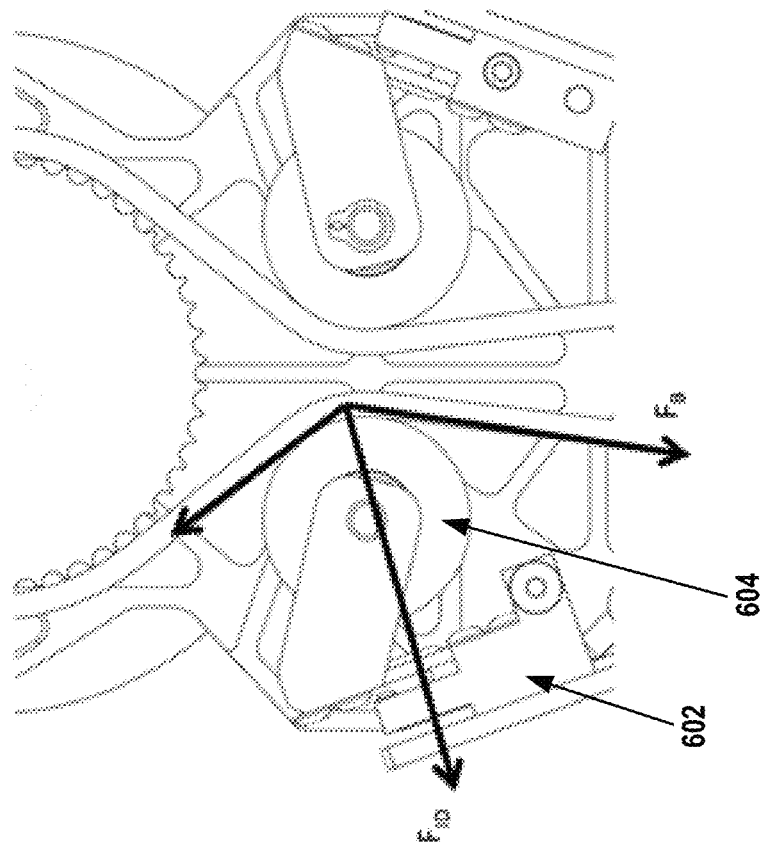
FIG. 6A is a diagram illustrating an example portion of a timing belt stage and determination of applied load.

FIG. 6A is a diagram illustrating an example portion of a timing belt stage and determination of applied load, and FIG. 6B is a diagram showing an example calculation of the output torque. As shown in FIGS. 6A-6B, applied load to a load cell 602, $F_{id}$, can be calculated as a function of applied output torque $T_q$ as follows:

$$F_{id} = 2F_B \cos(\Theta)$$

$$F_b = T_q/r$$

where $F_{id}$ is a normal force applied to the load cell 602, $F_B$ is a working tension on the belt, r is an output hub radius, and $\Theta$ is an angle of the belt to the load cell normal. (Although the angle $\Theta$ is shown to be perpendicular to applied force, additional bias may be considered as well to based on force applied at an angle offset from perpendicular, for example). It may be desired that the angle $\Theta$ of the belt on an idler 604 is as small as possible to increase a magnitude of a signal applied to a sensor of the load cell 602. The sensor may be a traditional strain gauge sensor or any other form of load measurement sensor. It may also be desired that a resonant frequency of the load cell 602 is high so as to not interfere with a control loop. Therefore, the load cell 602 may be designed with appropriate stiffness. One example advantage to this design is that a load sensor does not have to move with the output stage, which may eliminate a need for a moving cable.

The torque controlled actuator 100 in FIG. 1, using any of the belt tensioning systems shown in FIGS. 2-5, may be operated and controlled by a motor, motor amplifier, and control law.

Figure 7:
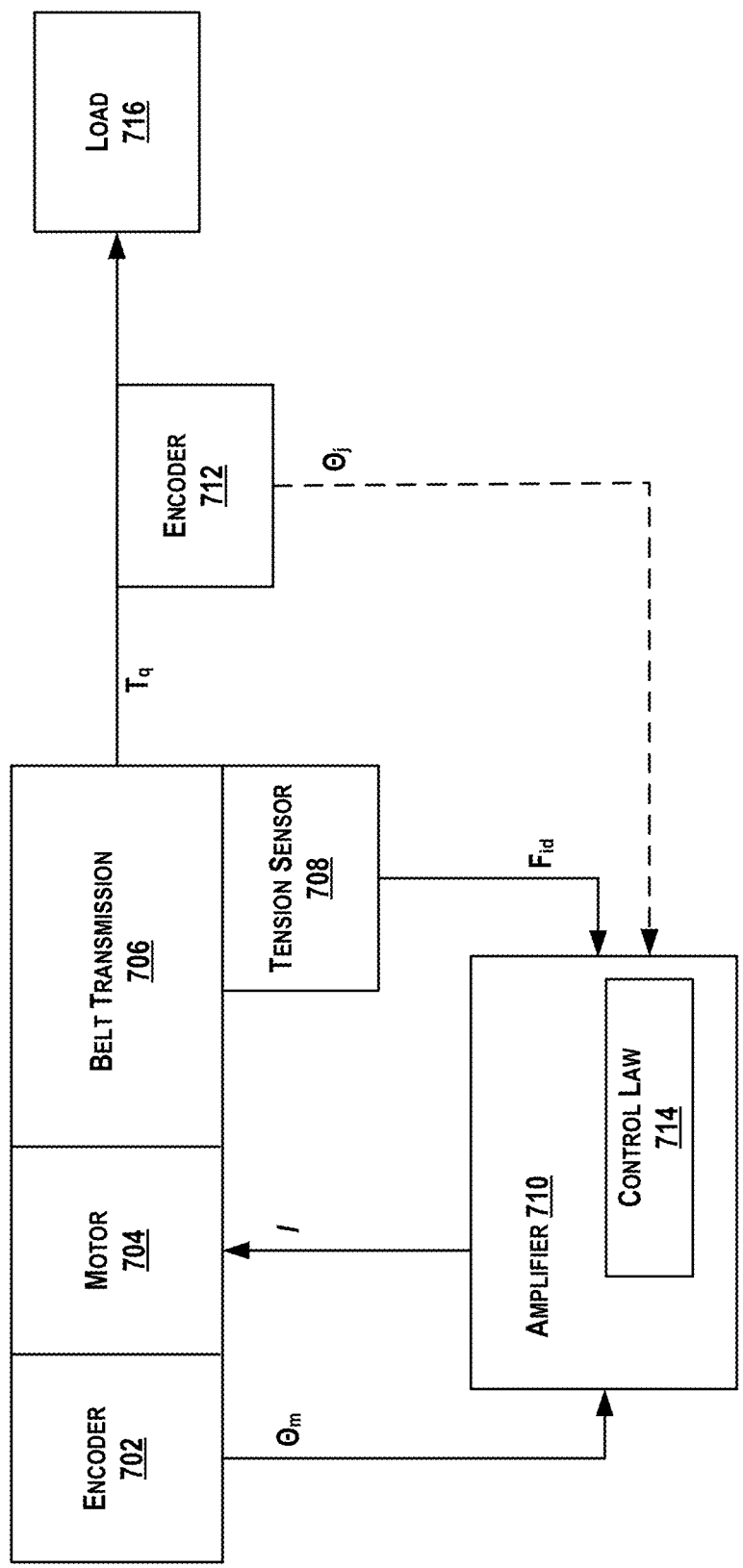
FIG. 7 is a block diagram illustrating an example system for control of a torque controlled actuator.

FIG. 7 is a block diagram illustrating an example system for control of a torque controlled actuator. As shown in FIG. 7, an encoder 702 may couple to a motor 704 that drive a belt transmission 706 of a single stage. A tension sensor 708 determines a belt tension sensor measurement, $F_{id}$, and outputs the belt tension sensor measurement to an amplifier 710. Another encoder 712 may couple to an output hub of the belt transmission 706 to sense a joint angle, $\Theta_j$, or load position. The encoders 702 and 712 may be optical encoders, Hall effect sensors, or other capacitive angle sensors, for example. The torque controlled actuator is controlled by the motor amplifier 710 that receives as inputs $\Theta_m$, the motor angle, the belt tension sensor measurement, $F_{id}$, and optionally $\Theta_j$, the joint angle, and outputs a commanded motor winding current, I, as a function of these inputs according to a control law module 714. The motor winding current, I, causes the motor 704 to drive the belt transmission 706 for an output torque, $T_q$, that is applied to a load 716.

The control law module 714 may transform state variables into command current to motor. A full state control or measure of a full state of the system (e.g., motor position with encoder, motor velocity, motor acceleration, joint position with encoder, output torque with load cells) can be utilized as a linear combination to calculate the command current. A servo-loop is created around tensor sensor values for torque applied at a joint. The control law module 714 may operate as a known proportional integral derivative (PID) module, for example. A PID controller may include a control loop feedback mechanism that calculates an error value as a difference between a measured process variable and a desired set point. The PID controller attempts to minimize the error by adjusting process control outputs. The PID controller algorithm may involve three separate constant parameters, including the proportional, the integral, and the derivative values, denoted P, I, and D. These values can be interpreted in terms of time: P depends on the present error, I on accumulation of past errors, and D is a prediction of future errors, based on current rate of change. A weighted sum of these three actions is used to adjust a process via a control element such as the output torque to be applied.

In one example, if less torque is desired, the amplifier 710 may lower the motor current to cause the motor 704 to drive the belt transmission 706 less strongly. For higher torque, the motor current may be increased. The motor current can be controlled as a continuous function of the sensed belt tension. Methods to achieve this include full state linear feedback with a dynamic model of the robotic and PID servo control. Additional control can be applied to accurately track a commanded joint position, torque, velocity, and/or impedance, for example.

The control law module 714, or other components of the design in FIG. 7, may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The control law module 714 may also be a computing device (or components of a computing device such as one or more processors), that may execute instructions to perform functions as described herein.

Within examples, operation of the torque controlled actuator can be modified for certain applications. For instance, if torque controlled actuator is in motion (e.g., is part of a moving link), then inertial effects of an idler may be coupled to a load cell if a mass of the idler is high. This interaction may be cancelled out in software by computing acceleration of the actuator using accelerometers or a kinematic model, inertial forces of the idler acting on the load cell, and a revised load value ($F_{id}'$) that subtracts away the inertial effect.

Within other examples, the tension sensing may exhibit hysteresis effects due to rubber of the timing belt being in a load path between a rigid tensile core of the belt and the strain gauge. This hysteresis can limit overall accuracy of the sensor which may be important for some applications. A hysteresis model can be employed to improve sensor accuracy. Standard modeling techniques, such as a Preisach Operator, can be employed to continuously compute the hysteresis value online and calculate a revised load value, $F_{id}'$, which cancels out the hysteresis.

Further, within other examples, the belt transmission may be compliant and stretch under load, causing a displacement in output position from an expected position. Use of an output encoder enables measurement of the actual output position independent of the load. A model of belt stretch may be employed in addition to, or instead of, the joint encoder. The belt stretch model can take as an input the applied tension in the belt, physical parameters of the belt such as modulus of elasticity, and environmental parameters such as temperature of the belt. The belt stretch model may output an amount of elastic stretch in the belt such that commanded motor position can be adjusted and a desired output position achieved. The model may be as simple as a linear spring, or may include non-linear effects such as hysteresis. Alternatively, the belt stretch can be measured empirically across a range of working loads and a look-up table used to compute the motor position offset.

The torque controlled actuator described in FIGS. 1-7 above may be used in many implementations. One example implementation includes a two degree of freedom (DOF) modular robot link or actuator system.

FIGS. 8A-8B illustrate side and top views of an example actuator system 800. The system 800 includes multiple torque controlled actuators 802a-b arranged side-by-side. Each torque controlled actuator 802a-b includes multiple timing belt stages coupled in serial including an input stage for coupling to a motor and an output stage for coupling to a load. In FIG. 8B, a first stage 804, a second stage 806, and a third stage 808 are shown (similar to the 3-stage actuator in FIG. 1). Each torque controlled actuator 802a-b includes a motor 810a-b, and the timing belt stages couple rotation of the motor 810a-b to an output of the output stage. Each torque controlled actuator 802a-b includes also includes tension sensors 812a-b, motor encoders 814a-b, and output encoders 816a-b.

In FIGS. 8A-8B, the torque controlled actuators 802a-b are coupled in the side-by-side arrangement through an a common frame 818. The common frame 818 supports the link load. Output hubs of the two torque controlled actuators 802a-b are attached to input pulleys of a differential 820. An output of the differential 820 is the link output to which a load can be attached. The differential 820 creates a multiple DOF actuated joint.

The common frame 818 may be a single rigid component that acts as a load bearing element of the actuator system 800, and incorporates mechanical features to act as a transmission structure (e.g., shaft and bearings supports, motor mounts, etc.). The common frame 818 can be configured as an endoskeleton or exoskeleton. As an endoskeleton, the torque controlled actuators 802a-b attach to an outside of the common frame 818, for example. This has service accessibility benefits and the link can be a single part. As an exoskeleton, the common frame 818 comprises two or more, potentially identical, parts that are attached to each other to form a rigid tube like structure, and the torque controlled actuators 802a-b may sit inside of the tube structure. This is advantageous for increased stiffness and lower weight.

The common frame 818 allows the two torque controlled actuators 802a-b to be arranged such that timing pulley shafts are commonly shared, and the common frame 818 is symmetric along its long axis allowing for the common frame 818 to be composed of two identical but flipped parts that are bolted together in either an endo- or exo-skeleton configuration. The common frame 818 may include two parts and have internal cavities to reduce weight. The common frame 818 may have features for thermal heat dissipation and internal cavities that can house control electronics.

FIGS. 8A-8B illustrate the system 800 with a type A differential 820 that gives pitch and roll adjustments on output. The differential 820 is a parallel mechanism with two rotary inputs aligned on a same axis and two rotary outputs aligned on orthogonal axis. As shown in FIGS. 8A-8B, the differential 820 employs a cable transmission. The differential 820 acts such that rotation in a same direction at the two input hubs creates motion along a first output DOF-1 and rotation in an opposite direction yields motion along output a second DOF-2. Alternatively gears may be used instead of cables. However, a cable transmission may exhibit high efficiency and zero backlash. The differential 820 may be employed in a pitch-yaw (type A) configuration as shown in FIGS. 8A-8B based on attachment of the differential 820 to another link.

FIGS. 8C-8D illustrate side and top views of another example actuator system 850. The system 850 includes multiple torque controlled actuators 852a-b arranged side-by-side. Each torque controlled actuator 852a-b includes multiple timing belt stages coupled in serial including an input stage for coupling to a motor and an output stage for coupling to a load. In FIG. 8D, a first stage 854, a second stage 856, and a third stage 858 are shown (similar to the 3-stage actuator in FIG. 1). Each torque controlled actuator 852a-b includes a motor 860a-b, and the timing belt stages couple rotation of the motor 860a-b to an output of the output stage. Each torque controlled actuator 852a-b includes also includes tension sensors 862a-b, motor encoders 864a-b, and output encoders 866a-b.

In FIGS. 8C-8D, the torque controlled actuators 852a-b are coupled in the side-by-side arrangement through a common frame 868. The common frame 868 supports the link load. Output hubs of the two torque controlled actuators 852a-b are attached to input pulleys of a differential 870. An output of the differential 870 is the link output to which a load can be attached. The differential 870 creates a multiple DOF actuated joint. The differential 870 is a pitch-roll configuration (type B) based on attachment of the differential 870 to another link. The differential 870 can combine the torque of the torque controlled actuators 852a-b to increase strength of the joint in one direction at a time. In a pitch-roll shoulder, for example, the pitch DOF may experience higher torque requirements than roll. Consequently, smaller motors and transmission ratios can be employed when using the differential 870, for example.

FIGS. 8A-8D illustrate an endoskeleton structure for the torque controlled actuator, for example.

FIGS. 9A-9B illustrate side and internal views of another example actuator system. In FIG. 9A, a torque controlled actuator is illustrated in a clamshell structure 902, and an internal view of the torque controlled actuator is shown. The torque controlled actuator may be similar to the torque controlled actuator shown in FIG. 1, and is shown utilizing the tensioning system shown in FIG. 5B. FIG. 9B illustrates the torque controlled actuator, and a motor 904 couples to an end and extends out of the clamshell structure. An output hub 906 extends out of the other end of the clamshell structure.

Figure 9C:
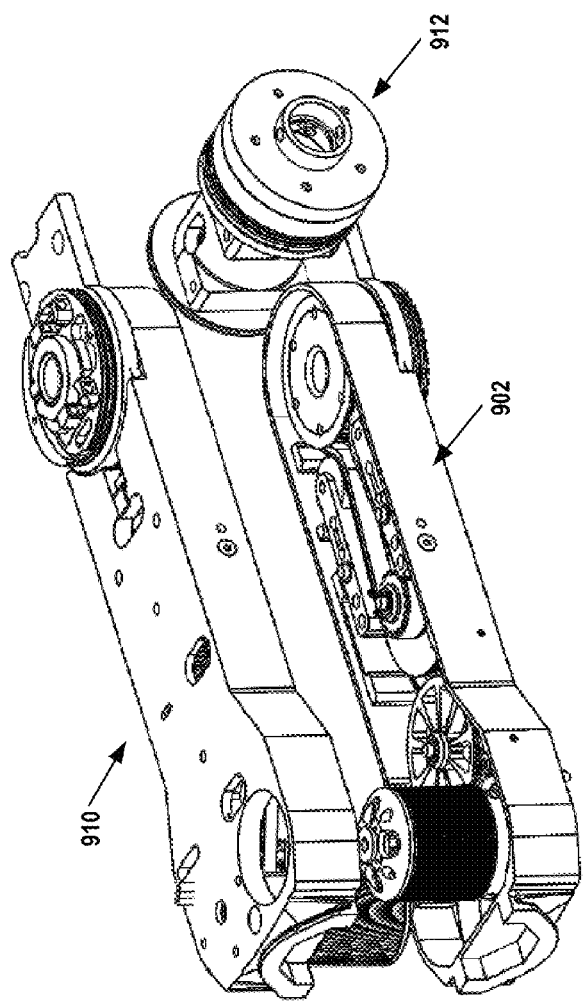
FIGS. 9C-9D illustrate the example actuator system in FIGS. 9A-9B in an enclosure.
Figure 9D:
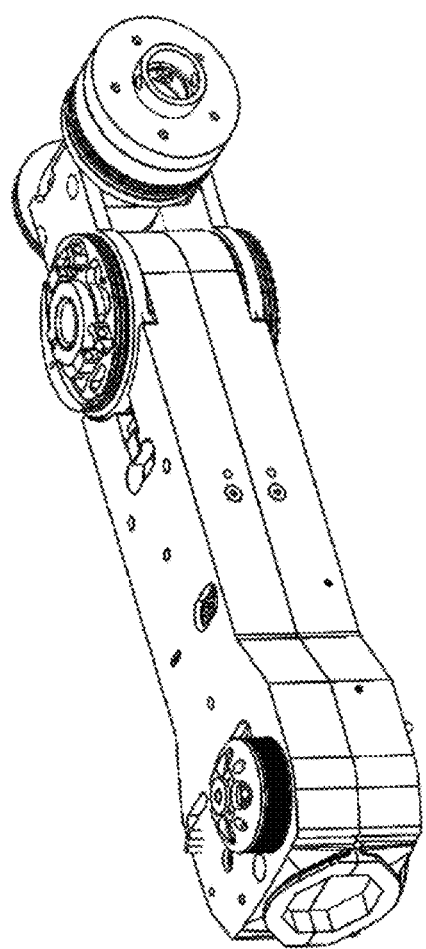

FIGS. 9C-9D illustrate the example actuator system in FIGS. 9A-9B in an enclosure. The clamshell structure includes a cover 910 that couples to the structure 902. Thus, two such clamshell modules bolt together to form a link structure, and a cable differential 912 couples to an end of the link structure.

FIGS. 9A-9D illustrate an exoskeleton structure for the torque controlled actuator, for example.

Within examples, the two torque controlled actuators 802a-b arranged side-by-side as shown in FIGS. 8A-8B, or the two torque controlled actuators 902a-b arranged side-by-side as shown in FIGS. 9A-9B create a link of a robot arm. Outputs of these actuators drive a differential mechanism to create a 2 DOF actuated joint. This link is modular in that several such links can be connected end-to-end to form a robot manipulator or other such systems.

Within examples, input and/or output connections to the interface 818 or interface 918 may have a quick connect interface that transmits both load and electrical signals and power. This enables the interface to be quickly attached to other such links and removed for service. The electrical connections can use spring contact connectors, such as found in battery packs.

Angle sensors, such as optical encoders, can be employed at the two outputs of the differentials in the systems 800 and 900 rather than an output of the torque controlled actuators. This allows for stretch of the cable or slop in gears of the differential to be measured and compensated for in control, improving the control accuracy.

In some examples, a control bus, sensor and power cables can be routed to subsequent links through a center of shafts of the differential. In particular, the differential input shaft can have a cutaway at a center to allow cable entry. A cable harness enters at the center of the shaft and exists end of the shaft. Next, the cable harness runs through each end of the differential output shaft and on to the next link, for example.

The example systems 800 and 900 shown in FIGS. 8A-8B and FIGS. 9A-9B include three belt stages with approximately 3.5:1 reduction per stage, yielding about 43:1 overall reduction. Each stage comprises a timing belt and two timing pulleys mounted on rolling bearings or bushings. Alternate designs may include non-belt stages (e.g., gears) with the effect of potentially limiting the zero backlash characteristic. It is desirable that a width of each belt increase in proportion to an expected working load of that transmission stage to ensure long lifetime of the transmission.

The example systems 800 and 900 shown in FIGS. 8A-8B and FIGS. 9A-9B also may be operated such that each belt stage is tensioned to greater than 50% of the working load of the transmission to ensure that each stage does not go slack during normal operation. Use of position sensors at the output and also the motor provides redundancy and enables detection of transmission failure modes such as belt breakage. It also enables compensation of the stretch of the belts in the transmission under load. If encoders are used on the motor and joint position, the joint position may be microstepped between each tick of the joint encoder to achieve higher precision. This can be accomplished by incrementally advancing the motor position according to the motor encoder (i.e., assuming that the motor encoder resolution multiplied by the gear ratio is greater than joint encoder resolution). Two load cells may be employed on each side of the output belt and output values subtracted from each other to compute the joint torque as described above. This may enable belt pretension to be measured and reported, enabling preemptive service of the transmission if the pretension needs to be adjusted. Redundant sensing also allows for detection of failures in the transmission, and common mode variations in the sensors (such as a temperature bias) can be subtracted out. In these designs, the motor may also be positioned away from the actuator output, allowing flexibility in the actuator mass distribution.

Figure 10:
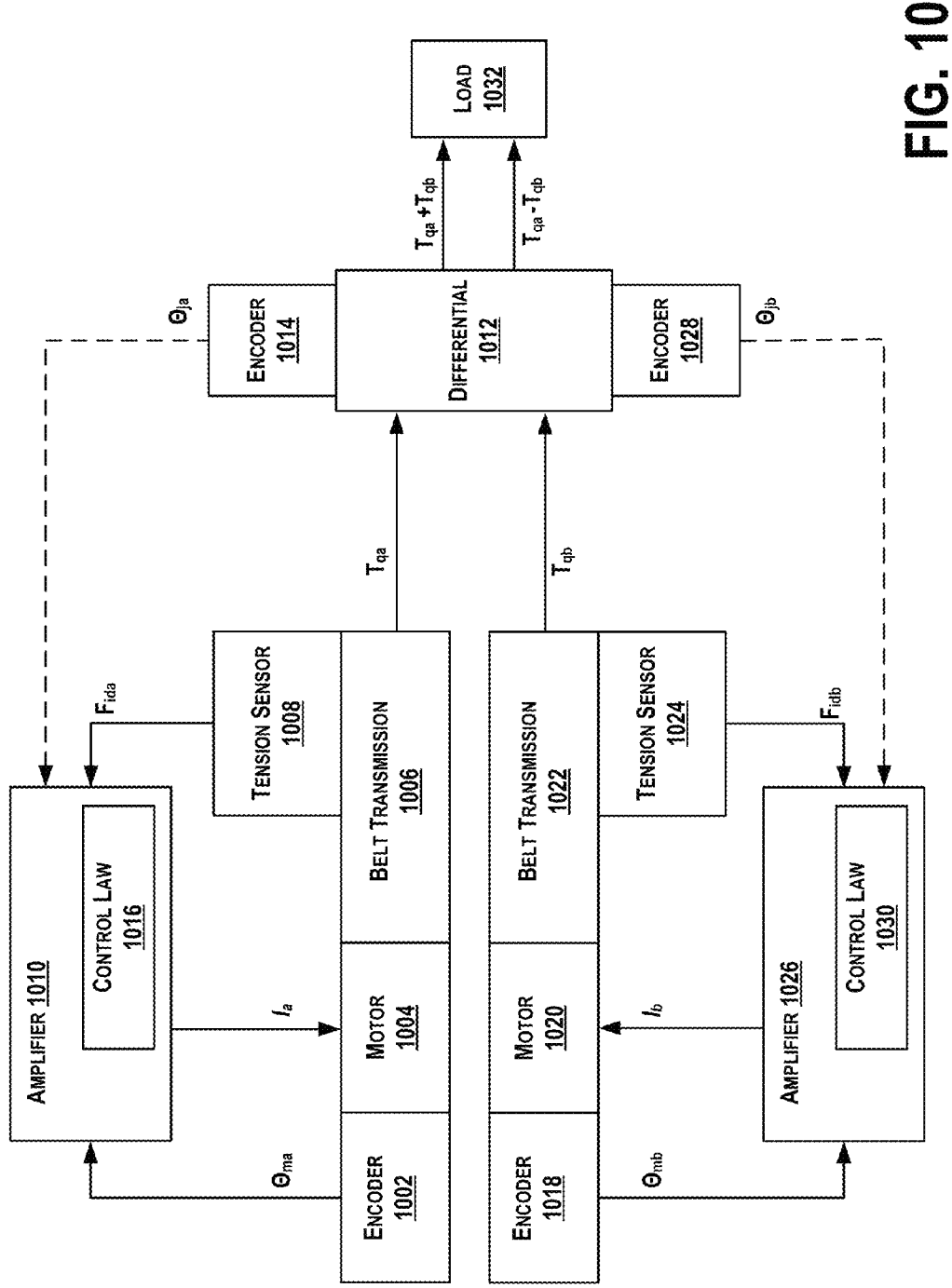
FIG. 10 is a block diagram illustrating an example system for control of an actuator system.

FIG. 10 is a block diagram illustrating an example system for control of an actuator system. As shown in FIG. 10, a first torque controlled actuator include an encoder 1002 that couples to a motor 1004 that drives a belt transmission 1006 of a single stage. A tension sensor 1008 determines a belt tension sensor measurement, $F_{ida}$, and outputs the belt tension sensor measurement to an amplifier 1010. Output torque, $T_{qa}$, may also be provided to a differential 1012. Another encoder 1014 may couple to an output hub of the differential 1012 to sense a joint angle, $\Theta_{ja}$, or load position. The torque controlled actuator is controlled by the motor amplifier 1010 that receives as inputs $\Theta_{ma}$, the motor angle, the belt tension sensor measurement, $F_{ida}$, and optionally $\Theta_{ja}$, the joint angle, and outputs a commanded motor winding current, $I_a$, as a function of these inputs according to a control law module 1016. The motor winding current, $I_a$, causes the motor 1004 to drive the belt transmission 1006 for an output torque, $T_{qa}$.

A second torque controlled actuator is similar (or identical to the first torque controlled actuator) and includes an encoder 1018 that couples to a motor 1020 that drives a belt transmission 1022 of a single stage. A tension sensor 1024 determines a belt tension sensor measurement, $F_{ida}$, and outputs the belt tension sensor measurement to an amplifier 1026. Output torque, $T_{qa}$, may also be provided to the differential 1012. Another encoder 1028 may couple to an output hub of the differential 1012 to sense a joint angle, $\Theta_{ja}$, or load position. The torque controlled actuator is controlled by the motor amplifier 1026 that receives as inputs $\Theta_{ma}$, the motor angle, the belt tension sensor measurement, $F_{ida}$, and optionally $\Theta_j$, the joint angle, and outputs a commanded motor winding current, $I_a$, as a function of these inputs according to a control law module 1030. The motor winding current, $I_a$, causes the motor 1020 to drive the belt transmission 1022 for an output torque, $T_{qa}$.

The block diagram in FIG. 10 is for a robot link comprising two of the torque controlled actuators described above. The optional output position encoders now measure $\Theta_{ja}$ and $\Theta_{jb}$, the 2 DOF output of the differential 1012. The differential 1012 produces a sum of the input torques, $T_{qa}+T_{qb}$, along one DOF, and a difference of the input torques, $T_{qa}-T_{qb}$, along the second DOF, either of which is applied to a load 1032.

The two DOF actuator system shown in FIGS. 8-10 may be arranged in multiple links to form a robot manipulator. The links may also be arranged to form other robotic systems, such as hexapod walkers and bipedal robots.

Figure 11:
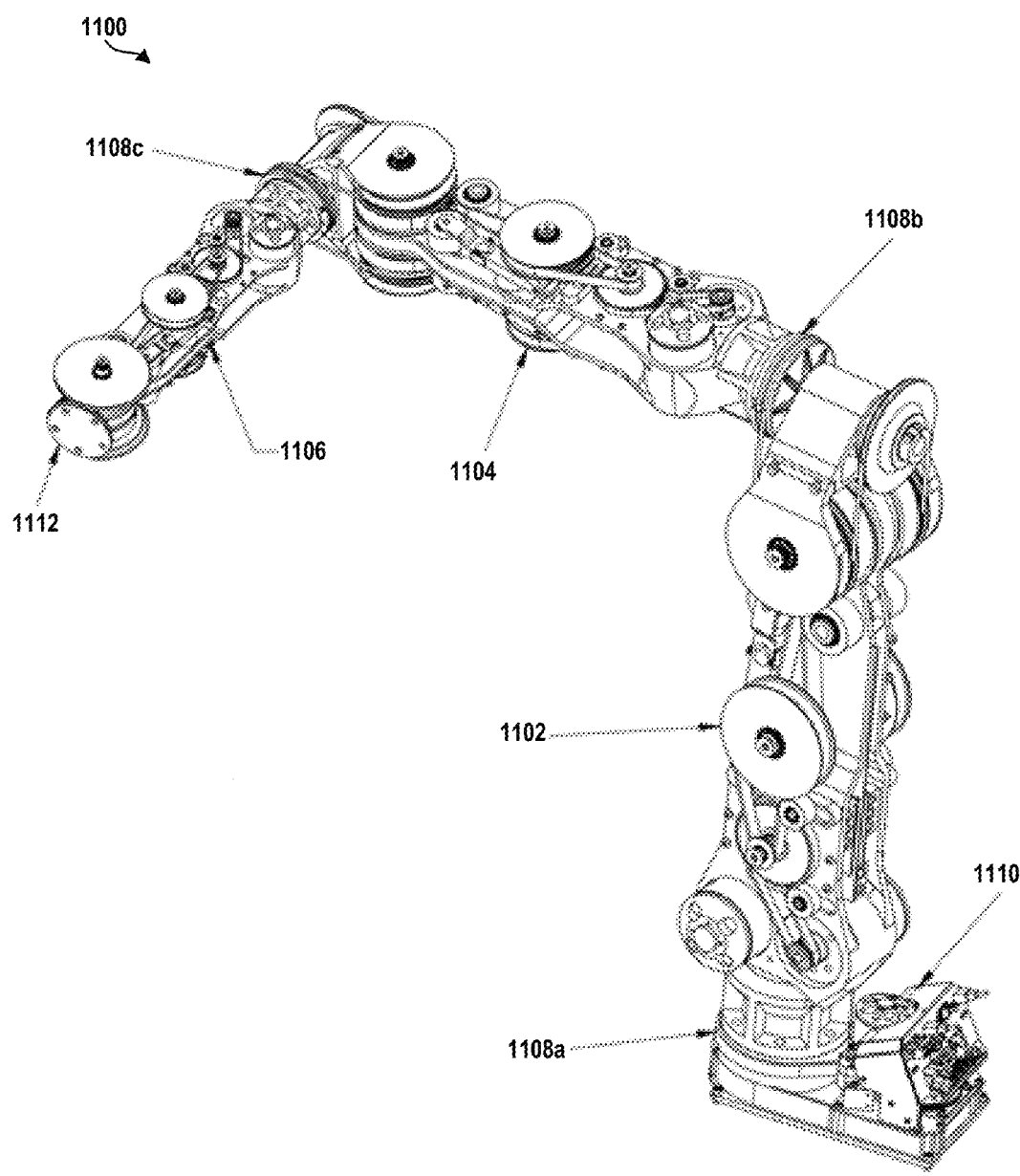
FIG. 11 is an example robot manipulator.

FIG. 11 is an example robot manipulator 1100. In one example, the robot manipulator 1100 is a seven DOF robot arm. As described, two torque controlled actuators comprise a link or actuator system, and three links together form an arm. Thus, the robot manipulator may be an actuator system that includes multiple modular links arranged in serial. As shown in FIGS. 8-9, each modular link includes multiple torque controlled actuators arranged side-by-side. A respective torque controlled actuator includes one or more timing belt stages coupled in serial including an input stage for coupling to a motor and an output stage for coupling to a load, and the one or more timing belt stages couple rotation of the motor to rotation of an output of the output stage. Each modular link also includes an interface to couple the multiple torque controlled actuators in the side-by-side arrangement, and a differential coupled to outputs of the multiple torque controlled actuators to create a two degree of freedom (DOF) actuated joint.

The robot manipulator 1100 includes multiple modular links 1102, 1104, and 1106, and link interfaces 1108a-c to couple the multiple modular links 1102, 1104, and 1106 in serial and to provide a multiple DOF robot manipulator. The robot manipulator 1100 may be a 7 DOF robot arm including three modular links arranged in a serial chain. An additional 1 DOF actuator 1110 (e.g., such as shown in FIGS. 2-4 including a single timing belt stage) may be employed at a root of the chain. The robot manipulator 1100 may be oriented such that the arm has a kinematic structure including base link (e.g., actuator 1110) to operate as a shoulder pan, a trunk link (e.g., link 1102) to operate as a shoulder pitch and shoulder roll, a bicep link (e.g., link 1104) to operate as an elbow pitch and forearm roll, and a forearm link (e.g., link 1106) to operate as a wrist pitch and wrist roll or yaw. A gripper interface 1112 may be provided at an end of the link 1106 to attach any gripper mechanism as desired for a particular application.

Within examples, the robot manipulator 1100 may include torque control and passive compliance for each joint enabling control strategies for safe operation next to people, and low gear ratios for high dynamic performance and low effective inertia. In other examples, the robot manipulator 1100 may have simple cable routing through a center of joints, and zero backlash transmissions for good precision.

Each link of the robot manipulator 1100 may use differential-A or differential-B depending on desired kinematics. The links 1102, 1104, and 1106 may be joined with a quick-connect type interface, allowing the arm to be quickly taken apart for service. Each quick-connect has electrical connectors to pass signal and power to the electronics, and also has a mechanical latch and features to securely transmit load between links.

Figure 12:
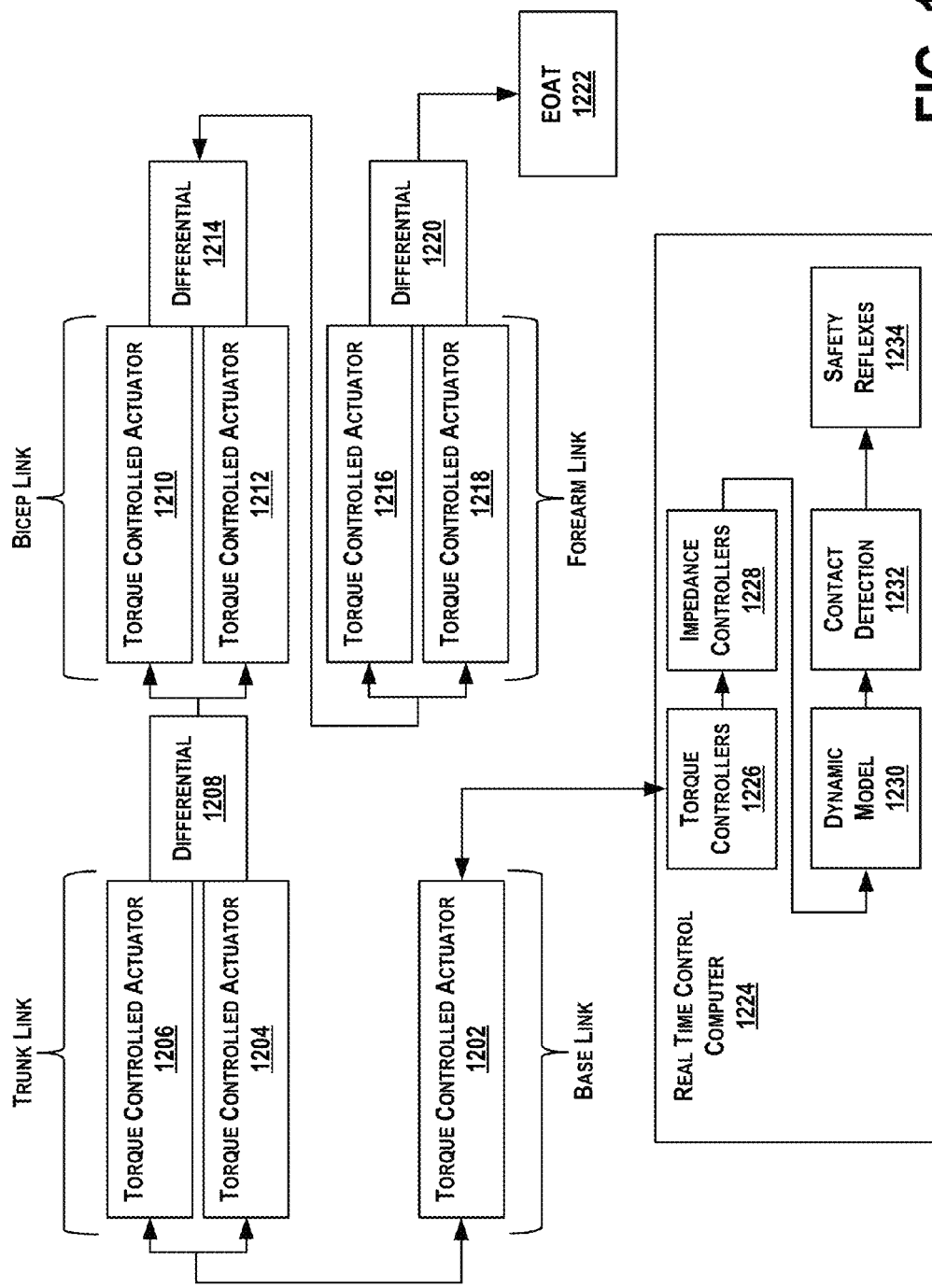
FIG. 12 is a block diagram illustrating an example system for control of a robot manipulator.

FIG. 12 is a block diagram illustrating an example system for control of a robot manipulator. The system includes a base link comprising a single torque controlled actuator 1202, coupled to a trunk link comprising side-by-side torque controlled actuators 1204 and 1206 coupled to a differential 1208. The differential 1208 connects to a bicep link that comprises side-by-side torque controlled actuators 1210 and 1212 coupled to differential 1214 that outputs to a forearm link. The forearm link comprises side-by-side torque controlled actuators 1216 and 1218 coupled to a differential 1220 that outputs to end-of-arm-tooling (EOAT) 1222. Thus, the base link, trunk link, bicep link, and forearm link are modular links coupled to form a 7 DOF arm.

A real time control computer 1224 coupled to the base link to handle higher level control at a deterministic rate and command desired torques to actuator amplifiers. The real time control computer 1224 includes torque controllers 1226 and impedance controllers 1228 to determine motor currents for the controllers based on output torques in a feedback control loop as described above. Other hybrid force-position controllers and position controllers as would be suitable for a robotic arm may be used as well. A dynamic model 1230 may also be used based on measured link inertias, accelerations, and velocities, to compute expected instantaneous torques during a known task. A contact detector 1232 may compare such expectations against measured torques provided by the sensors, and a difference above a specified threshold can be flagged as unexpected contact with a person or environment. A safety reflex 1234 may adapt control policy to react appropriately to the contact. Reactions may include reversal of torques, locking of motor brakes, changing to a low impedance gravity compensation mode, or modification of the arm trajectory, for example.

Figure 13:
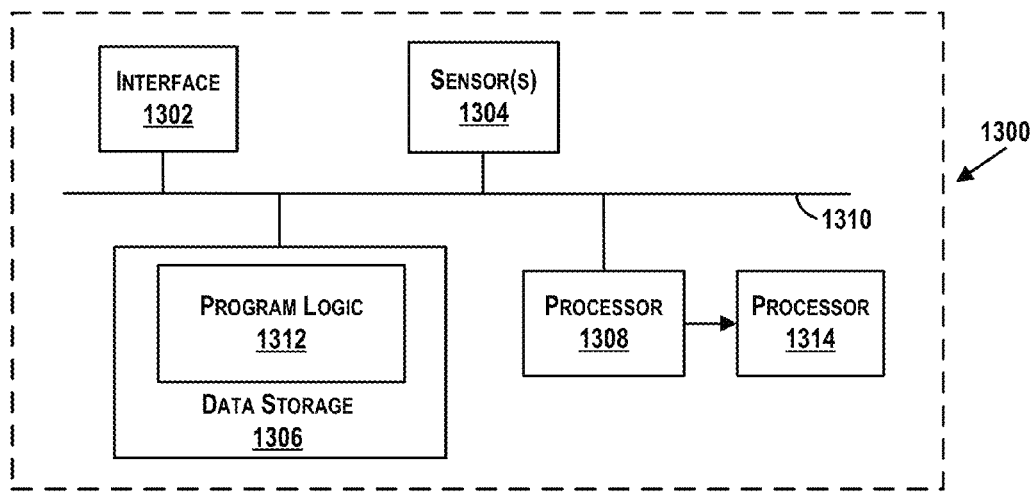
FIG. 13 illustrates a schematic drawing of an example computing device.

The real time control computer 1224 may take the form of a computer device, such as illustrated in FIG. 13, which illustrates a schematic drawing of an example computing device 1300. In some examples, some components illustrated in FIG. 13 may be distributed across multiple computing devices. However, for the sake of example, the components are shown and described as part of one example device 1300. The device 1300 may be or include a mobile device, desktop computer, tablet computer, or similar device that may be configured to perform the functions described herein.

The device 1300 may include an interface 1302, sensor(s) 1304, data storage 1306, and a processor 1308. Components illustrated in FIG. 13 may be linked together by a communication link 1310. The communication link 1310 is illustrated as a wired connection; however, wireless connections may also be used. The device 1300 may also include hardware to enable communication within the device 1300 and between the client device 1300 and another computing device (not shown), such as a server entity. The hardware may include transmitters, receivers, and antennas, for example.

The interface 1302 may be configured to allow the device 1300 to communicate with another computing device (not shown), such as a server. Thus, the interface 1302 may be configured to receive input data from one or more computing devices, and may also be configured to send output data to the one or more computing devices. The interface 1302 may also be configured to receive input from and provide output to a torque controlled actuator or modular link of a robot arm, for example. The interface 1302 may include a receiver and transmitter to receive and send data. In other examples, the interface 1302 may also include a user-interface, such as a keyboard, microphone, touchscreen, etc., to receive inputs as well.

The sensor 1304 may include one or more sensors, or may represent one or more sensors included within the device 1300. Example sensors include an accelerometer, gyroscope, pedometer, light sensors, microphone, camera, or other location and/or context-aware sensors that may collect data of the arm (e.g., motion of arm) and provide the data to the data storage 1306 or processor 1308.

The processor 1308 may be configured to receive data from the interface 1302, sensor 1304, and data storage 1306. The data storage 1306 may store program logic 1312 that can be accessed and executed by the processor 1308 to perform functions executable to determine instructions for operation of the robot arm. Example functions include determination of motor current for torque controlled actuators of modular links of the arm based on sensed tension in timing belts, output torque, and optionally angular displacements of output hubs based on a control loop or other feedback mechanism to determine desired output torques. Any functions described herein, or other example functions for the torque controlled actuator, actuator system, or robot manipulator, may be performed by the device 1300 or processor 1308 of the device via execution of instructions stored on data storage.

The device 1300 is illustrated to include an additional processor 1314. The processor 1314 may be configured to control other aspects of the device 1300 including displays or outputs of the device 1300 (e.g., the processor 1314 may be a GPU). Example methods described herein may be performed individually by components of the device 1300, or in combination by one or all of the components of the device 1300. In one instance, portions of the device 1300 may process data and provide an output internally in the device 1300 to the processor 1314, for example. In other instances, portions of the device 1300 may process data and provide outputs externally to other computing devices.

Within some examples herein, operations may be described as methods for performing functions, and methods may be embodied on a computer program product (e.g., a tangible computer readable storage medium or non-transitory computer readable medium) that includes instructions executable to perform the functions.

Figure 14:
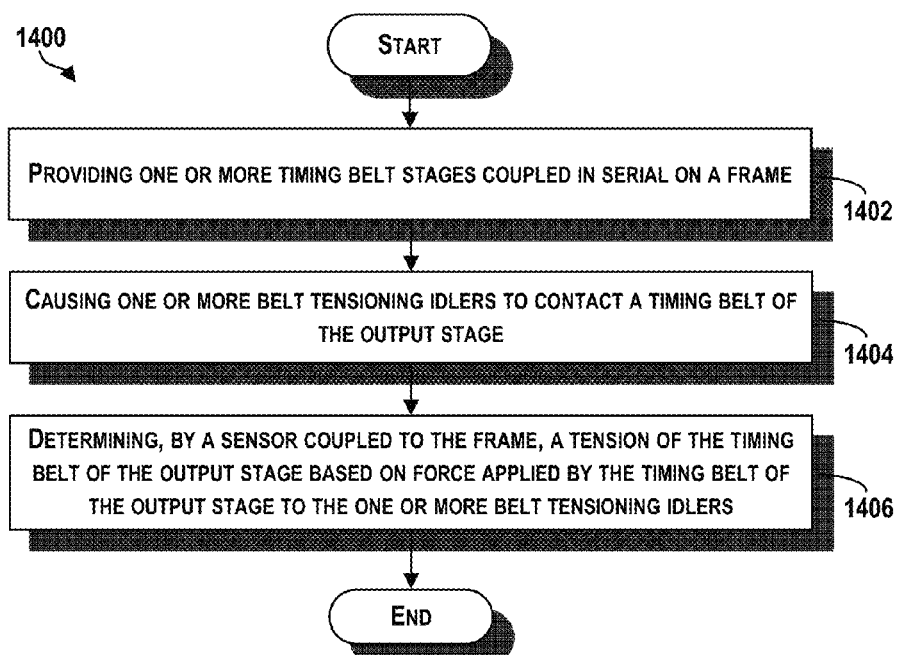
FIG. 14 is a flowchart illustrating an example method for operating a torque controlled actuator.

FIG. 14 is a flowchart illustrating an example method 1400 for operating a torque controlled actuator. At block 1402, the method 1400 includes providing one or more timing belt stages coupled in serial on a frame. The one or more timing belt stages include an input stage for coupling to a motor and an output stage for coupling to a load, and the one or more timing belt stages couple rotation of the motor to rotation of an output of the output stage. At block 1404, the method 1400 includes causing one or more belt idlers to contact a timing belt of the output stage. At block 1406, the method includes determining, by a sensor coupled to the frame, a tension of the timing belt of the output stage based on force applied by the timing belt of the output stage to the one or more belt idlers.

Figure 15:
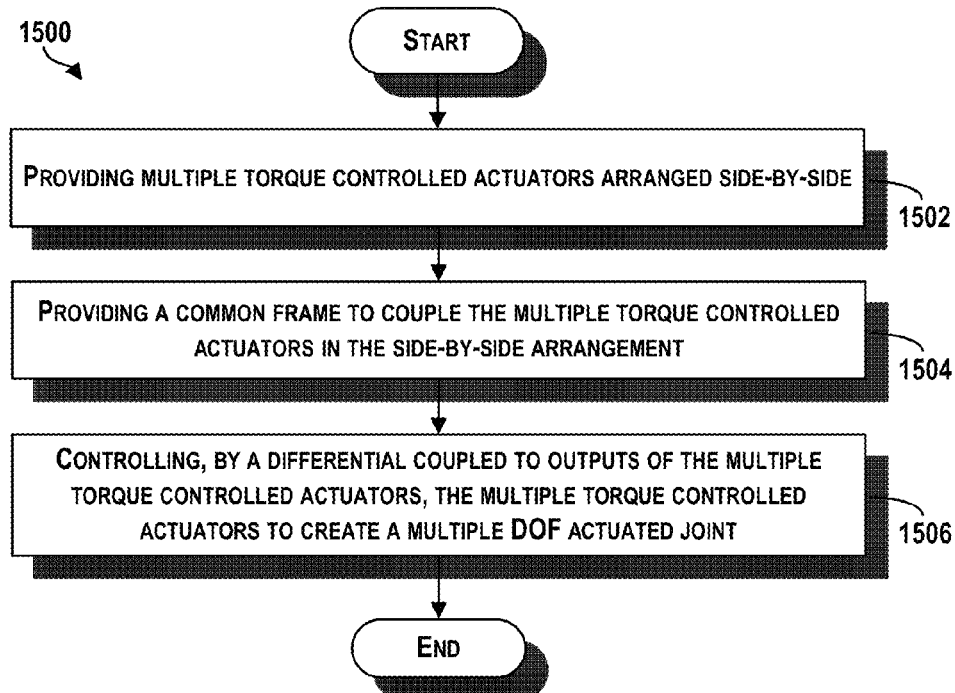
FIG. 15 is a flowchart illustrating an example method for operating an actuator system.

FIG. 15 is a flowchart illustrating an example 1500 method for operating an actuator system. At block 1502, the method 1500 includes providing multiple torque controlled actuators arranged side-by-side. A given torque controlled actuator comprises one or more timing belt stages coupled in serial including an input stage for coupling to a motor and an output stage for coupling to a load, and the one or more timing belt stages couple rotation of the motor to rotation of an output of the output stage. At block 1504, the method 1500 includes providing a common frame to couple the multiple torque controlled actuators in the side-by-side arrangement. At block 1506, the method 1500 includes controlling, by a differential coupled to outputs of the multiple torque controlled actuators, the multiple torque controlled actuators to create a multiple degree of freedom (DOF) actuated joint.

Figure 16:
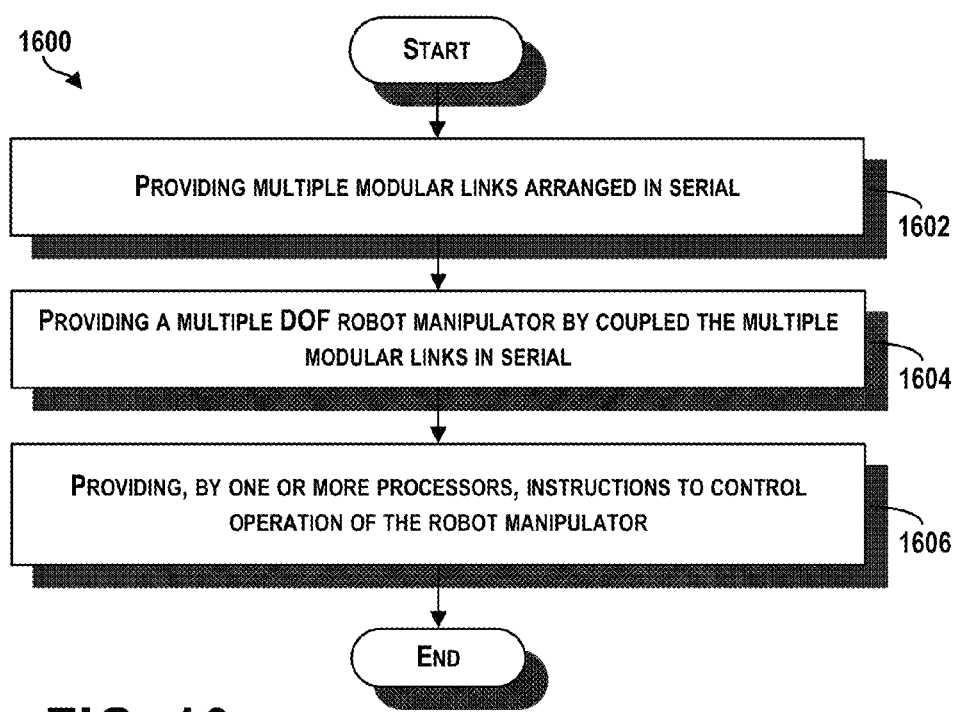
FIG. 16 is a flowchart illustrating an example method for operating another actuator system.

FIG. 16 is a flowchart illustrating an example 1600 method for operating another actuator system. At block 1602, the method 1600 includes providing multiple modular links arranged in serial. A respective modular link comprises multiple torque controlled actuators arranged side-by-side, and a given torque controlled actuator comprises one or more timing belt stages coupled in serial including an input stage for coupling to a motor and an output stage for coupling to a load. The one or more timing belt stages couple rotation of the motor to rotation of an output of the output stage. The modular links also include an interface to couple the multiple torque controlled actuators in the side-by-side arrangement, and a differential coupled to outputs of the multiple torque controlled actuators to create a two degree of freedom (DOF) actuated joint. At block 1604, the method 1600 includes providing a multiple DOF robot manipulator by coupling the multiple modular links in serial. At block 1606, the method 1600 includes providing, by one or more processors, instructions to control operation of the robot manipulator.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A torque controlled actuator comprising:
   a frame;
   one or more timing belt stages coupled in serial on the frame, wherein the one or more timing belt stages include an input stage for coupling to a motor and an output stage for coupling to a load, wherein the one or more timing belt stages couple rotation of the motor to rotation of an output of the output stage;
   one or more belt idlers coupled to the frame, wherein the one or more belt idlers contact a timing belt of the output stage;
   a strain gauge coupled to the frame to determine a tension of the timing belt of the output stage based on force applied by the timing belt of the output stage to the one or more belt idlers; and
   a control bus and one or more processors, wherein the strain gauge outputs the tension of the timing belt of the output stage to the control bus, and the one or more processors are coupled to the control bus for determining output torque of the torque controlled actuator based on the tension of the timing belt of the output stage.

2. The torque controlled actuator of claim 1, wherein the one or more timing belt stages include:
   a stage input;
   an output hub; and a timing belt wrapped around the stage input and the output hub.

3. The torque controlled actuator of claim 2, wherein the stage input and the output hub comprise pulleys mounted on rolling bearings.

4. The torque controlled actuator of claim 2, further comprising an encoder coupled to the frame to determine an angular position of the output hub.

5. The torque controlled actuator of claim 1, wherein a given timing belt stage provides a reduction of motor input and increases torque output.

6. The torque controlled actuator of claim 1, wherein the one or more timing belt stages include three timing belt stages coupled serially and provide a reduction of motor input within a range of 4:1 to 50:1.

7. The torque controlled actuator of claim 1, wherein the one or more belt idlers include an idler wheel that rolls against the timing belt of the output stage, and the torque controlled actuator further comprises:

a load cell coupled to the one or more belt idlers, wherein the load cell is arranged as a compression structure, wherein deflection of the load cell is determined by the strain gauge, and wherein the strain gauge is coupled to the load cell.

8. The torque controlled actuator of claim 7, further comprising a hardstop coupled to the frame, the hardstop for limiting an amount of deflection of the load cell providing overload protection.

9. The torque controlled actuator of claim 7, wherein an applied load to the load cell, $F_{id}$, is based on a function of output torque $T_q$ as follows $$F_{id}=2F_b \cos(\Theta)$$

$$F_b=T_q/r$$

where $F_{id}$ is a normal force applied to the load cell, $F_B$ is a working tension on the timing belt, r is an output hub radius, and $\Theta$ is an angle of the timing belt to a normal of the load cell.

10. The torque controlled actuator of claim 1, wherein the one or more belt idlers are provided in a T-shaped configuration so as to contact the timing belt at multiple locations along a length of the timing belt, wherein the T-shaped configuration includes two idlers maintaining a timing belt preload tension and providing output load to the strain gauge.

11. The torque controlled actuator of claim 10, further comprising a slider for pre-tensioning the timing belt by moving the T-shaped configuration toward an output of the output stage.

12. The torque controlled actuator of claim 1, further comprising:

a plurality of belt idlers provided at multiple locations along a length of the timing belt;

a first load cell including the strain gauge configured to determine a first tension of the timing belt of the output stage based on force applied by the timing belt of the output stage to one of the plurality of belt idlers; and a second load cell including a second strain gauge to determine a second tension of the timing belt of the output stage based on force applied by the timing belt of the output stage to another of the plurality of belt idlers, wherein a torque of the timing belt of the output stage is based on a difference of the first tension and the second tension.

13. The torque controlled actuator of claim 1, further comprising one or more idlers to contact timing belts of stages to apply adjustable tension to the timing belts;

wherein the one or more idlers comprise a wheel to apply adjustable tension to the timing belts.

14. The torque controlled actuator of claim 1, further comprising:

the motor coupled to the input stage and to drive the one or more timing belt stages.

15. The torque controlled actuator of claim 14, further comprising a motor encoder to sense a position of the motor.

16. The torque controlled actuator of claim 14, further comprising:

a motor amplifier that determines a motor current based on the tension of the timing belt of the output stage, wherein the motor amplifier determines the motor current based on a servo control loop to control the motor current applied to the motor to achieve a desired output torque.

17. A torque controlled actuator comprising:

a frame;

one or more timing belt stages coupled in serial on the frame, wherein the one or more timing belt stages include an input stage for coupling to a motor and an output stage for coupling to a load, wherein the one or more timing belt stages couple rotation of the motor to rotation of an output of the output stage;

the motor coupled to the input stage and to drive the one or more timing belt stages;

one or more belt idlers coupled to the frame, wherein the one or more belt idlers contact a timing belt of the output stage;

a strain gauge coupled to the frame to determine a tension of the timing belt of the output stage based on force applied by the timing belt of the output stage to the one or more belt idlers; and a motor amplifier that determines a motor current based on the tension of the timing belt of the output stage, wherein the motor amplifier determines the motor current based on a servo control loop to control the motor current applied to the motor to achieve a desired output torque.

* * * * *